(12) United States Patent
Rauschenbach et al.

(10) Patent No.: US 7,261,636 B2
(45) Date of Patent: Aug. 28, 2007

(54) DRIVE

(75) Inventors: Stefan Rauschenbach, Grosspostwitz (DE); Johannes Jacob, Obergurig (DE); Hans-Georg Pötschke, Bischofswerda (DE)

(73) Assignee: GKN Walterscheid GmbH (DE)

( * ) Notice: Subject to any disclaimer, the term of this patent is extended or adjusted under 35 U.S.C. 154(b) by 223 days.

(21) Appl. No.: 10/971,833

(22) Filed: Oct. 22, 2004

(65) Prior Publication Data

US 2005/0087383 A1    Apr. 28, 2005

(30) Foreign Application Priority Data

Oct. 24, 2003    (DE) ............................... 103 49 773

(51) Int. Cl.
*F16D 3/18* (2006.01)
(52) U.S. Cl. ........................................ 464/16; 464/18
(58) Field of Classification Search .............. 464/716, 464/18–21, 26, 901; 137/515.3, 515.5
See application file for complete search history.

(56) References Cited

U.S. PATENT DOCUMENTS

| 3,757,535 A | | 9/1973 | Stein ........................... 464/162 |
| 3,990,538 A | * | 11/1976 | Casey et al. ............... 464/16 X |
| 5,286,232 A | | 2/1994 | Engle ........................... 464/16 |
| 6,102,804 A | | 8/2000 | Kretschmer et al. | |

FOREIGN PATENT DOCUMENTS

| DE | 1 008 062 | 10/1957 |
| DE | 7129985 | 11/1971 |
| DE | 43 11 321 A1 | 10/1993 |
| GB | 937639 | 9/1963 |
| JP | 8-303478 | 11/1996 |

\* cited by examiner

*Primary Examiner*—Greg Binda
(74) *Attorney, Agent, or Firm*—Harness, Dickey & Pierce, P.L.C.

(57) ABSTRACT

A drive in an agricultural machinery driveline has a drive housing (1), which forms an interior (18), and is at least partially filled with lubricant. A first shaft (4) is rotatably supported in the drive housing (1) around a longitudinal axis (13) and is guided out of the interior (18). First longitudinal teeth (8) connect, in a rotationally fast way, to a second shaft (9) via a second longitudinal teeth (10) formed to complement the first longitudinal teeth (8). One of the two shafts (4) has a receiving bore (5) arranged coaxially relative to the longitudinal axis (13). The bore (5) has longitudinal teeth (8) which enable insertion of the other shaft (9) by its longitudinal teeth (10). A lubricant guiding mechanism (19, 22, 29) is in the first shaft (4) or in the drive housing (1). In the connected condition of the two shafts (4, 9), the guiding mechanism connects the interior (18) to the receiving bore (5), as well as a valve (25). The valve (25) is integrated into the lubricant guiding mechanism (19, 22, 29) and can be set between a closed position, closing the lubricant guiding means (19, 22, 29), and an open position. The valve (25) is transferable from the closed position into the open position by connecting the first shaft (4) to the second shaft (9).

8 Claims, 4 Drawing Sheets

DRIVE

CROSS-REFERENCE TO RELATED APPLICATIONS

This application claims priority to German Patent Application No. 10349773.0, filed Oct. 24, 2003, which application is herein expressly incorporated by reference.

BACKGROUND OF THE INVENTION

The invention relates to a drive and, more particularly, to an agricultural machinery driveline with a drive housing and a rotatably supported first shaft. The first shaft comprises longitudinal teeth to connect to a second shaft, for example to a shaft journal or a driveshaft. The longitudinal teeth of the first shaft and the longitudinal teeth of the second shaft, together, form a splined connection to transmit torque between the first shaft and the second shaft.

In order to avoid symptoms of wear in such prior art drives, the splined connection is greased. However, it has been found in practice that this measure is not always sufficient and that the splined connection is worn prematurely.

SUMMARY OF THE INVENTION

It is the object of the present invention to propose a drive of the initially mentioned type whose splined connection has a longer service life.

In accordance with the invention, a drive in an agricultural machinery driveline includes a drive housing. The drive housing forms an interior and is at least partially filled with a lubricant. A first shaft is rotatably supported in the drive housing around a longitudinal axis. The first shaft extends out of the interior. The first shaft has first longitudinal teeth to connect, in a rotationally fast way, to a second shaft. The second shaft has second longitudinal teeth formed to complement the first longitudinal teeth. One of the two shafts includes a receiving bore arranged coaxially relative to the longitudinal axis. The bore includes one of the shaft's longitudinal teeth into which the other shaft's longitudinal teeth are inserted. A lubricant guiding mechanism is in the first shaft or in the drive housing. The guiding mechanism, in the connected condition of the two shafts, connects the interior to the receiving bore. A valve is integrated into the guiding mechanism. The valve can be set between a closed position, to close the lubricant guiding mechanism, and an open position. The valve is transferred from the closed position into the open position by connecting the first shaft to the second shaft.

This solution is advantageous since the splined connection is integrated into the lubrication circuit of the drive. The valve ensures that a connection exist between the interior of the drive housing and the receiving bore only if the first shaft and the second shaft are connected to one another. Thus, the uncontrolled escape of lubricant is avoided when the shafts are disconnected.

The receiving bore is preferably arranged in the first shaft. Accordingly, the second shaft is inserted into the receiving bore.

According to a further embodiment, the valve is designed to close automatically. The valve includes a valve body which is displaceable between a closed position, in which it closes a valve bore, and an open position. Furthermore, the valve body is designed so that, when the second bore is received in the receiving bore, the valve body is supported in the bore and held in the open position.

When the shaft journal is introduced into the receiving bore, the shaft journal abuts the valve body. As this occurs, the shaft journal moves the valve body out of the closed position into the open position.

The lubricant guiding mechanism can include a bore in the first shaft. The valve is incorporated into the bore. The valve body projects beyond an end face of the first shaft towards the second shaft. The valve body is arranged so that, in the inserted condition, the valve body comes into contact with the second shaft and is held by the second shaft in the open position.

Furthermore, the receiving bore can form an inner circumferential face. The lubricant guiding mechanism extends transversely to the longitudinal axis from the interior of the drive housing to the inner circumferential face.

According to a further embodiment, a through-bore is arranged in the first shaft. The through-bore forms the receiving bore. The valve is arranged in a bearing bore of the drive housing. The bearing bore serves to receive a bearing axle to support the second shaft. The valve includes a valve body which is displaceable between a closed position and an open position. The valve is loaded towards the closed position where it closes a valve bore. The valve body is designed so that, when the bearing axle is received in the bearing bore, the valve body is supported in the bearing bore and held in the open position.

The valve preferably includes a housing and a valve body. The valve body is adjustable in a valve bore, in the form of a through-bore of the housing, along an open position and a closed position. The valve bore has a first bore portion and a second bore portion. The second bore portion diameter is reduced relative to the first bore portion. The valve body is guided in the first bore portion and has an out-of-round cross-section. The diameter of the valve body is smaller inside the second bore portion than the diameter of the second bore portion. In the closed position, the valve body projects from the housing. Furthermore, the valve body includes a sealing portion which comes into contact with a sealing face of the housing between the first bore portion and the second bore portion in the closed position. In a preferred embodiment, the sealing portion includes a sealing ring positioned on the valve body.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

Preferred embodiments will be described below with reference to the drawings wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
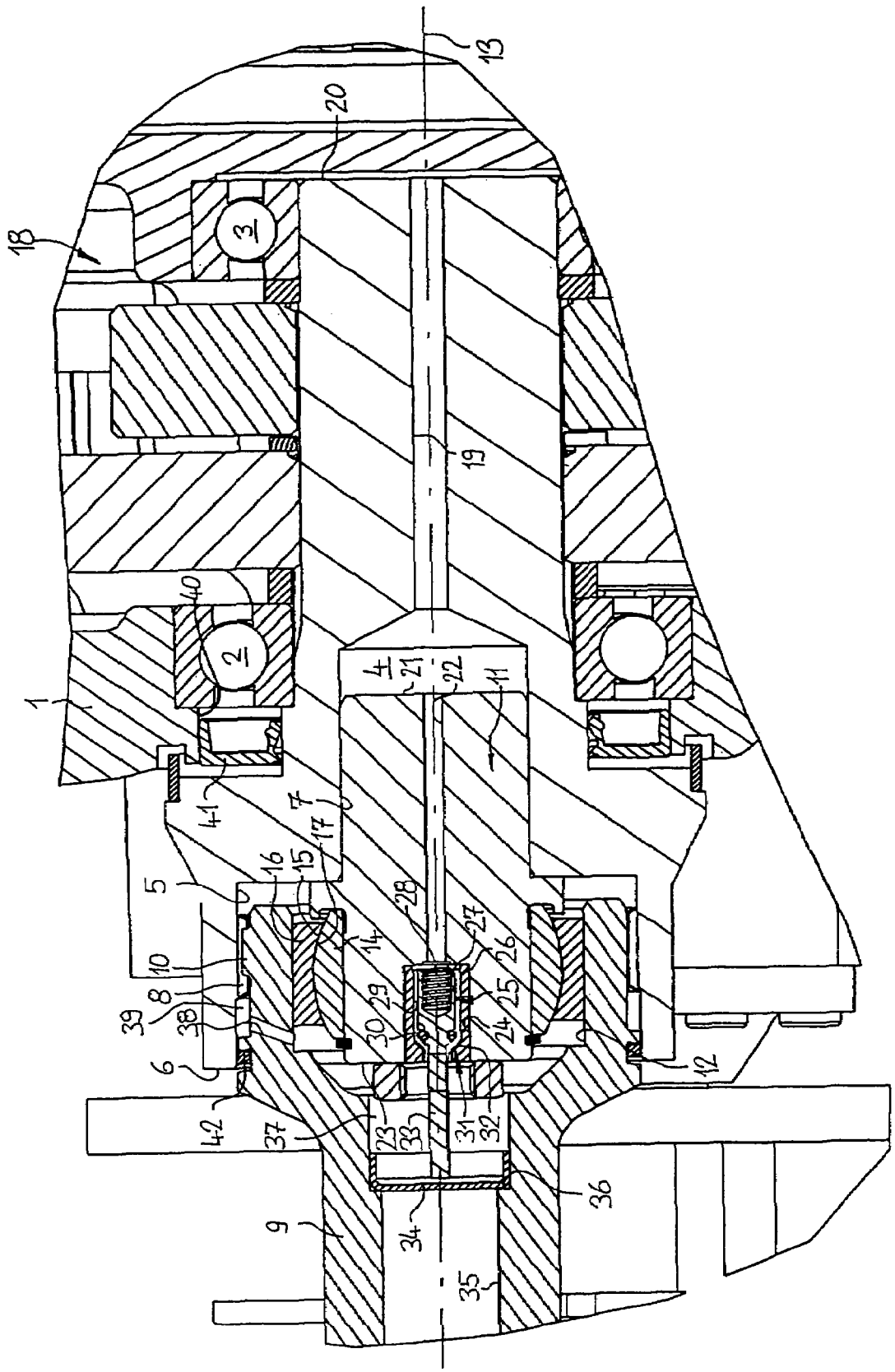
FIG. 1 is a longitudinal section view through a first embodiment of an inventive drive.

FIG. 1 shows a drive with a drive housing 1 supporting, via deep groove ball bearings 2 and 3, a first shaft 4 rotatable around a longitudinal axis 13. The first shaft 4 projects from the drive housing 1. At a free end of the first shaft, which projects from the drive housing, a receiving bore 5 starts from a first end face 6 of the first shaft 4. The receiving bore is arranged coaxially relative to the longitudinal axis 13. As the first shaft 4 extends further, the receiving bore 5 changes into a bore 7 with a reduced diameter. The bore 7 is also arranged coaxially relative to the longitudinal axis 13.

The receiving bore 5 includes first longitudinal teeth 8 in the form of inner teeth. A second shaft 9 is inserted into the receiving bore 5. The second shaft 9 includes second longitudinal teeth 10 which corresponds to the first longitudinal teeth 8. The longitudinal teeth 8 and 10 form a splined and a rotationally fast connection between the first shaft 4 and the second shaft 9.

A pin 11 is pressed into the bore 7 of the first shaft 4. The pin 11 forms part of the first shaft 4. The pin 11 projects from the bore 7 into the receiving bore 5 and into a central bore 12 of the second shaft 9. A first joint ring 14 is on the end of the pin 11 which projects from the bore 7 of the first shaft 4. The first joint ring 14 has a first joint face 15 in the form of a spherical outer face. The first joint ring 14 is positioned inside a second joint ring 16. The second joint ring 16 has a second joint face 17 in the form of a spherical inner face. The first joint face 15 and the second joint face 17 contact one another at their complementary faces. The second joint ring 16 is positioned in the central bore 12 of the second shaft 9, so that slight angular deviations can be compensated for between the pin 11 and the second shaft 9.

The drive housing 1 forms an interior 18 which is at least partially filled with a lubricant. The first shaft 4 includes a lubricant channel in the form of a through-bore 19. The through-bore 19 extends coaxially relative to the longitudinal axis 13 and starts from a second end face 20 which faces away from the first end face 6 and ends in the bore 7 of the first shaft 4. Furthermore, the pin 11 includes a lubricant channel in the form of a through-bore 22. The through-bore 22 starts from a first end face 21 of the pin 11 and leads to a second end face 23 of the pin. The first end face 21 is arranged inside the bore 7 of the first shaft 4 so that the pin through-bore 22 communicates with the first shaft through-bore 19.

The pin through-bore 22 has a bore portion 24 with an increased diameter. The bore portion 24 starts from the pin second end face 23 and receive valve 25. The valve 25 has a housing 26 as well as a valve body 27. The valve body 27 is axially adjustable along the longitudinal axis 13 in the housing 26 between an illustrated open position and a closed position. The valve body 27 is loaded towards assuming its closed position by a pressure spring 28 which is supported on the pin 11, on the one hand, and on the valve body 27, on the other hand.

A through-bore 29 is provided in the housing 26. The through-bore 29 forms a lubricant channel. A sealing face 30 is formed in the through-bore 29. The sealing face 30, in the closed position, is contacted by a sealing portion 31 of the valve body 27. The sealing portion 31 is formed by a sealing ring 32 which is located on the valve body 27.

A switching portion 33, of the valve body 27, projects from the through-bore 29 of the housing 26 towards the second shaft 9. In the open position of the valve body 27 as illustrated, the switching portion 33 axially abuts a cover 34. The cover 34 is arranged in a bore 35 of the second shaft 9 axially supported against a shoulder 36.

The through-bore 29 of the housing 26 ends in a lubricant chamber 37. The lubricant chamber 37, via a radial bore 38 in the second shaft 9, is connected to the intermediate chamber 39 between the first shaft 4 and the second shaft 9. The lubricant chamber 37 is partially arranged inside the receiving bore 5.

The lubricant channels, in the form of the through-bores 19, 22 and 29, form a lubricant guiding mechanism which guides lubricant from the interior 18 into the receiving bore 5. The lubricant flows through the through-bores 19, 22 and 29 into the lubricant chamber 37 where it lubricates the joint faces 15, 17. Through the radial bore 38, the lubricant continues to be guided to the splined teeth where it lubricates the first and second longitudinal teeth 8 and 10.

In order to seal the interior 18, a sealing ring 41 is provided in the bore 40 of the drive housing 1. Thus, the first shaft 4 is guided out of the drive housing in a sealed condition. Furthermore, in order to seal the interior 18, a sealing ring 42 is provided between the first shaft 4 and the second shaft 9.

The valve body 27, due to the spring force of the pressure spring 28, is transferred into the closed position when the second shaft 9 is extracted from the receiving bore 5 of the first shaft 4. Thus, the through-bore 29 is outwardly sealed. Thus, the lubricant cannot escape from the interior 18.

Figure 2:
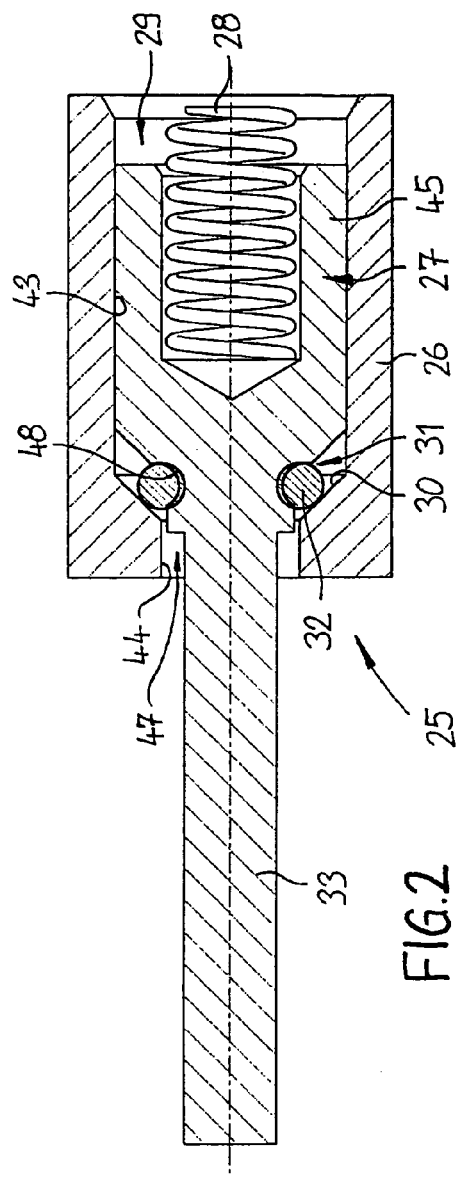
FIG. 2 is a longitudinal section view through the valve according to FIG. 1.
Figure 3:
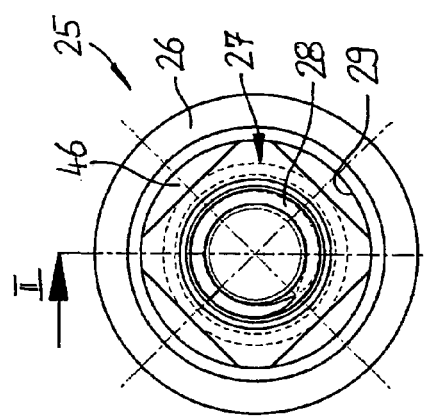
FIG. 3 is a front view of the valve according to FIG. 2.
Figure 4:
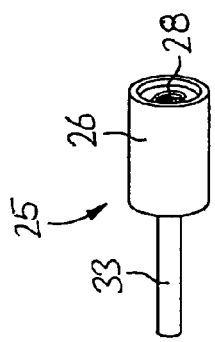
FIG. 4 is a perspective view of the valve according to FIG. 2.

FIGS. 2, 3 and 4 show different views of the valve 25 according to FIG. 1. The through-bore 29 constitutes a valve bore that includes a first bore portion 43 and a second bore portion 44. The second bore portion 44 has a smaller diameter than the first bore portion. A guiding portion 45 axially guides the valve body 27 in the first bore portion 43. The guiding portion 45 is slidingly and radially supported against the inner face of the first bore portion 43. The cross-section of the guiding portion 45 deviates from the shape of a circle (FIG. 3). Thus through-channels 46 are formed between the guiding portion 45 and the inner wall of the first bore portion 43 and enable lubricant passage.

The valve body 27 is guided by the switching portion 33 through the second bore portion 44. The switching portion 33 has a smaller diameter than the second bore portion 44. Thus, an annular gap 47 is formed between the switching portion 33 and the inner face of the second bore portion 44. Thus, lubricant is able to pass through gap 47. A sealing face 30 is arranged between the first bore portion 43 and the second bore portion 44. The sealing face 30 has a conical shape. In the closed position as illustrated in FIG. 2, the sealing ring 32, which forms the sealing portion 31 of the valve body 27, is in sealing contact with the sealing face 30. The sealing ring 32 is positioned in a circumferential groove 48 of the valve body 27. When the valve body 27 is transferred from the closed position, as illustrated in FIG. 2, into the open position as shown in FIG. 1, the sealing ring 32 lifts off the sealing face 30. Thus, this ensures a through-flow of lubricant.

Figure 5:
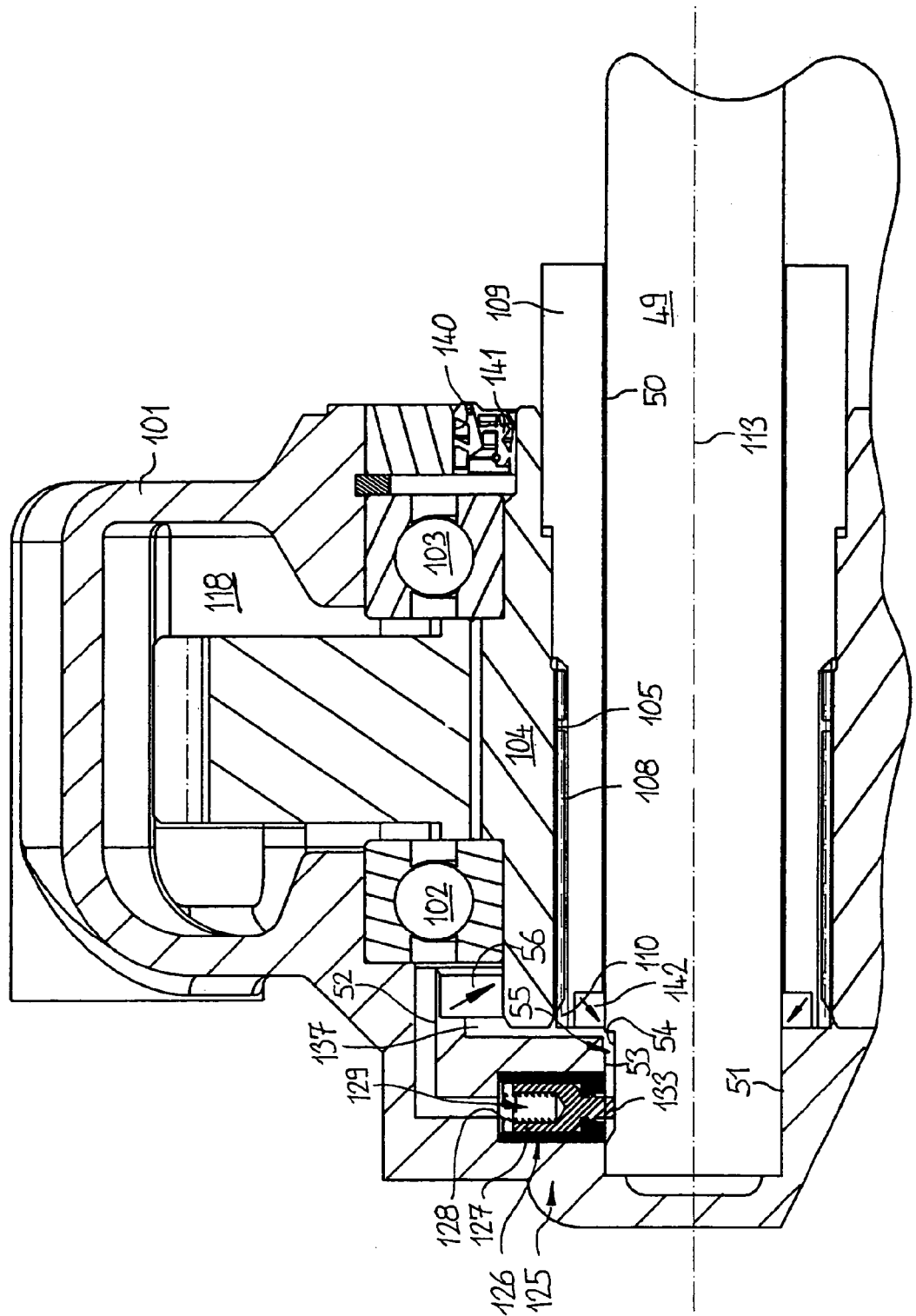
FIG. 5 is a longitudinal section view of a second embodiment of an inventive drive.

FIG. 5 shows a second embodiment of an inventive drive. A drive housing 101 has deep groove ball bearings 102, 103 which rotatably supports a first shaft 104 around a longitudinal axis 113. The first shaft 104 is guided through an aperture 140 out of the drive housing 101. The first shaft 104 is sealed by a shaft sealing ring 141.

The first shaft 104 is in the form of a hollow shaft and includes a receiving bore 105 which receives a second shaft 109. The receiving bore 105 has first longitudinal teeth 108 which engages second longitudinal teeth 110 of the second shaft 109. This splined connection ensures a rotationally fast connection between the first shaft 104 and the second shaft 109. The second shaft is also in the form of a hollow shaft which is rotatably arranged on a bearing axle 49. The bearing axle 49 is guided through a through-bore 50 of the second shaft 109 and is positioned in a bore 51 of the drive housing 101. Thus, it is possible for the second shaft 109 to be pulled out of the receiving bore 105 of the first shaft 104, with the second shaft 109 being removed together with the bearing axle 49.

A lubricant channel 52 is provided in the drive housing 101. The lubricant channel 52 serves as a lubricant guiding mechanism. Lubricant is guided from the interior 118 of the drive housing 101 to the bore 51. A valve 125 is provided in the region of the bore 51. The valve 125 corresponds to the valve according to FIG. 1, with identical components having been given reference numbers increased by the value of 100.

The valve switching portion 133 projects radially inwardly from an inner circumferential face 53 of the bore 51. Thus, by inserting the bearing axle 49 into the blind bore 51, the valve body 127 is transferred into the open position. Furthermore, the bearing axle 49 is provided with a groove 54 into which the switching portion 133 projects when the bearing axle 49 is positioned in the bore 51. Thus, a gap 55 is formed between the bearing axle 49 and the inner circumferential face 53 of the blind bore 51. The gap 55 ensures that the lubricant is able to flow. The groove 54 extends as far as a lubricant chamber 137 in which the first shaft 104 is supported. The lubricant chamber 137 changes directly into the receiving bore 105. Thus, when the valve 125 is open, lubricant is ensured to be guided from the interior 118 through the lubricant channel 52, forming the lubricant guiding mechanism, through the valve 125 along the groove 54 to the receiving bore 105 in order to lubricate the first and second longitudinal teeth 108 and 110.

A shaft sealing ring 58 is provided to ensure that the lubricant chamber 137 is sealed relative to the interior 118. The shaft sealing ring 56 seals the first shaft 104 relative to the drive housing 101. Furthermore, a shaft sealing ring 142 is provided between the second shaft 109 and the bearing axle 49 to seal the lubricant chamber 137 towards the outside.

Figure 6:
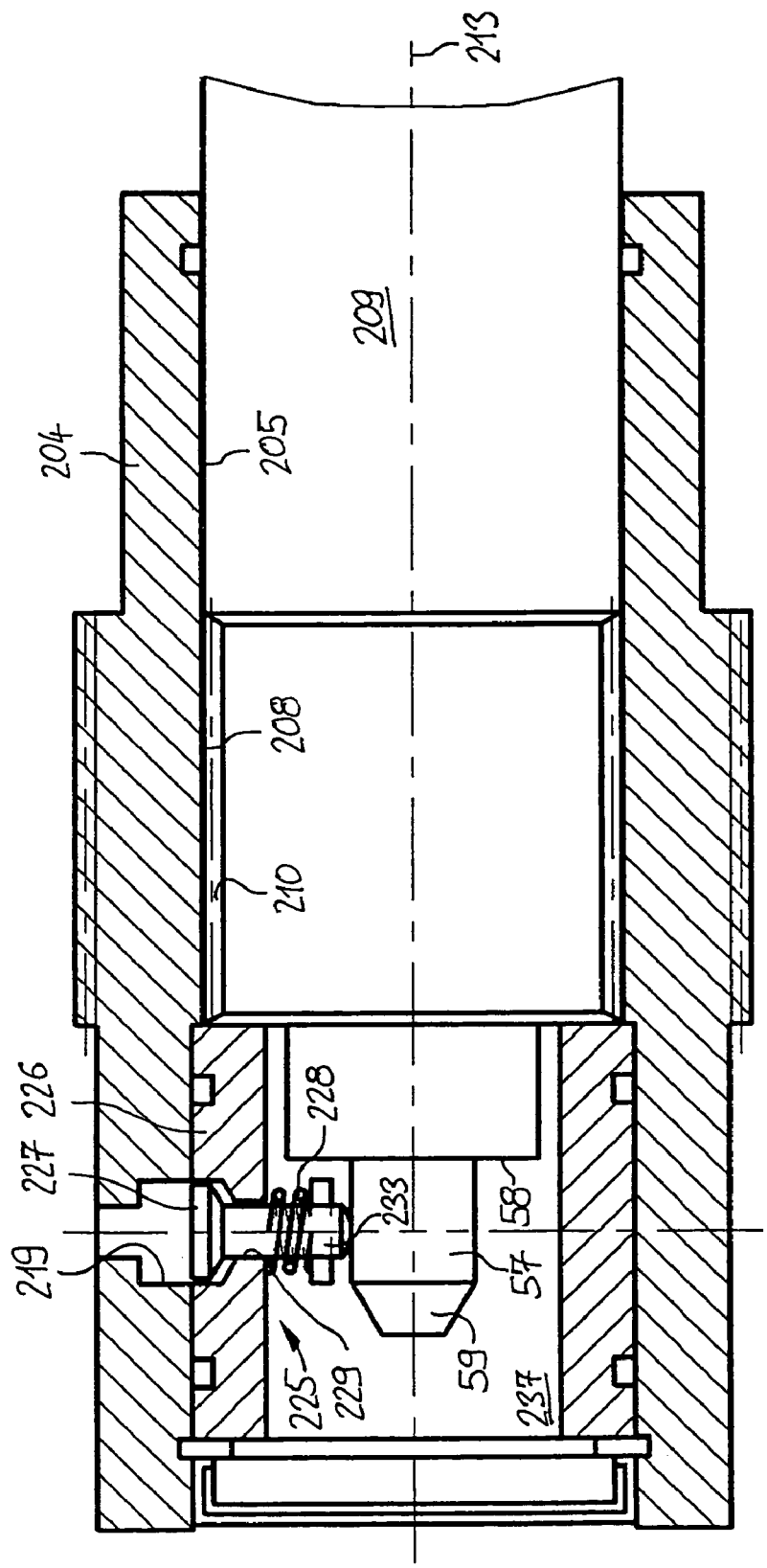
FIG. 6 is a longitudinal section view of a further embodiment of a first and second groove which can be inserted into a drive housing.

FIG. 6 shows a sketch of a further embodiment, illustrating only the first shaft and the second shaft. Any components corresponding to the components of FIG. 1 have been given reference numbers increased by the value of 200. In this context, reference is made to the description of FIGS. 1, 2, 3 and 4.

In this embodiment, the valve 225 is not arranged axially, but radially. In the embodiment according to FIG. 6, the second shaft 209 is inserted, from the right, into the receiving bore 105 of the first shaft 104. A switching cam 57 projects from an end face 58 of the second shaft 209. The switching cam 57 transfers the valve body 227 from the closed position into the open position upon insertion of the second shaft 209. A conical end portion 59 is provided on the switching cam to move the valve body 227 between its closed and open position. The switching portion 233 of the valve body 227 is guided along the conical end portion 59 and moves into the open position. Otherwise, the embodiment according to FIG. 6 corresponds to that of FIG. 1.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A drive, comprising:
    a drive housing which forms an interior and is at least partially filled with a lubricant;
    a first shaft rotatably supported in the drive housing around a longitudinal axis, said first shaft extends out of the interior and comprises first longitudinal teeth, said longitudinal teeth connected, in a rotationally fast way, to a second shaft having second longitudinal teeth forming a complement to said first longitudinal teeth, said second shaft connected, in a rotationally fast way, to the first shaft by means of the first and second longitudinal teeth;
    one of said first and second shafts comprises a receiving bore arranged coaxially relative to the longitudinal axis, one of said first and second longitudinal teeth in said receiving bore for enabling insertion on the other shaft via its longitudinal teeth;
    lubricant guiding mechanism in the first shaft or in the drive housing, said guiding mechanism, in a connected condition of the two shafts, connects the interior of the drive housing to the receiving bore in one of said first and second shafts;
    a valve integrated into the guiding mechanism, said valve can be set between a closed position, for closing the lubricant guiding mechanism, and an open position, said valve being transferable from the closed position into the open position by connecting the first shaft to the second shaft.

2. The drive according to claim 1, wherein the receiving bore, which receives the second shaft, is arranged in the first shaft.

3. The drive according to claim 2, wherein the valve is designed so as to be able to close automatically, said valve comprises a valve body which can be displaced between a closed position, in which it closes a valve bore, and an open position, and said valve body is designed so that, if the receiving bore receives the second shaft, it is supported on said second shaft and held in the open position.

4. The drive according to claim 3, wherein the lubricant guiding mechanism comprise a bore in the first shaft into which the valve is incorporated, said valve body projects beyond an end face of the first shaft towards the second shaft and said valve body is arranged so that, in the inserted condition, it comes into contact with the second shaft and is held by said second shaft in the open position.

5. The drive according to claim 3, wherein the receiving bore forms an inner circumferential face and said lubricant guiding means, which extend transverse to the longitudinal axis from the interior, being guided to said inner circumferential face.

6. The drive according to claim 1, wherein a through-bore forming the receiving bore is arranged in the first shaft, said valve is arranged in a bore of the drive housing, said bore serves to receive a bearing axle for supporting the second shaft, said valve comprises a valve body which is displaceable between a closed position and an open position and is loaded towards the closed position in which it closes a valve bore, and said valve body is designed so that, when the bearing axle is received in the bore, it is supported on said bearing axle and held in the open position.

7. The drive according to claim 1, wherein the valve comprises a housing and a valve body, said valve body is displaceable in a valve bore in the form of a through-bore of the housing along a displacement axis between an open position and a closed position, said valve bore comprises a first bore portion and a second bore portion, said second bore portion diameter is reduced relative to the first bore portion, said valve body is guided in the first bore portion and comprises an out-of-round cross-section, the diameter of the valve body inside the second bore portion is smaller than the diameter of the second bore portion and, in the closed position, said valve body projects from the housing, and said valve body comprises a sealing portion which, in the closed position, comes into contact with a sealing face of the housing between the first bore portion and the second bore portion.

8. The drive according to claim 7, wherein the sealing portion comprises a sealing ring which is positioned on the valve body.

* * * * *